April 18, 1944.  H. H. MOHL  2,346,860
CAR TRUCK
Filed Sept. 26, 1941  2 Sheets-Sheet 1
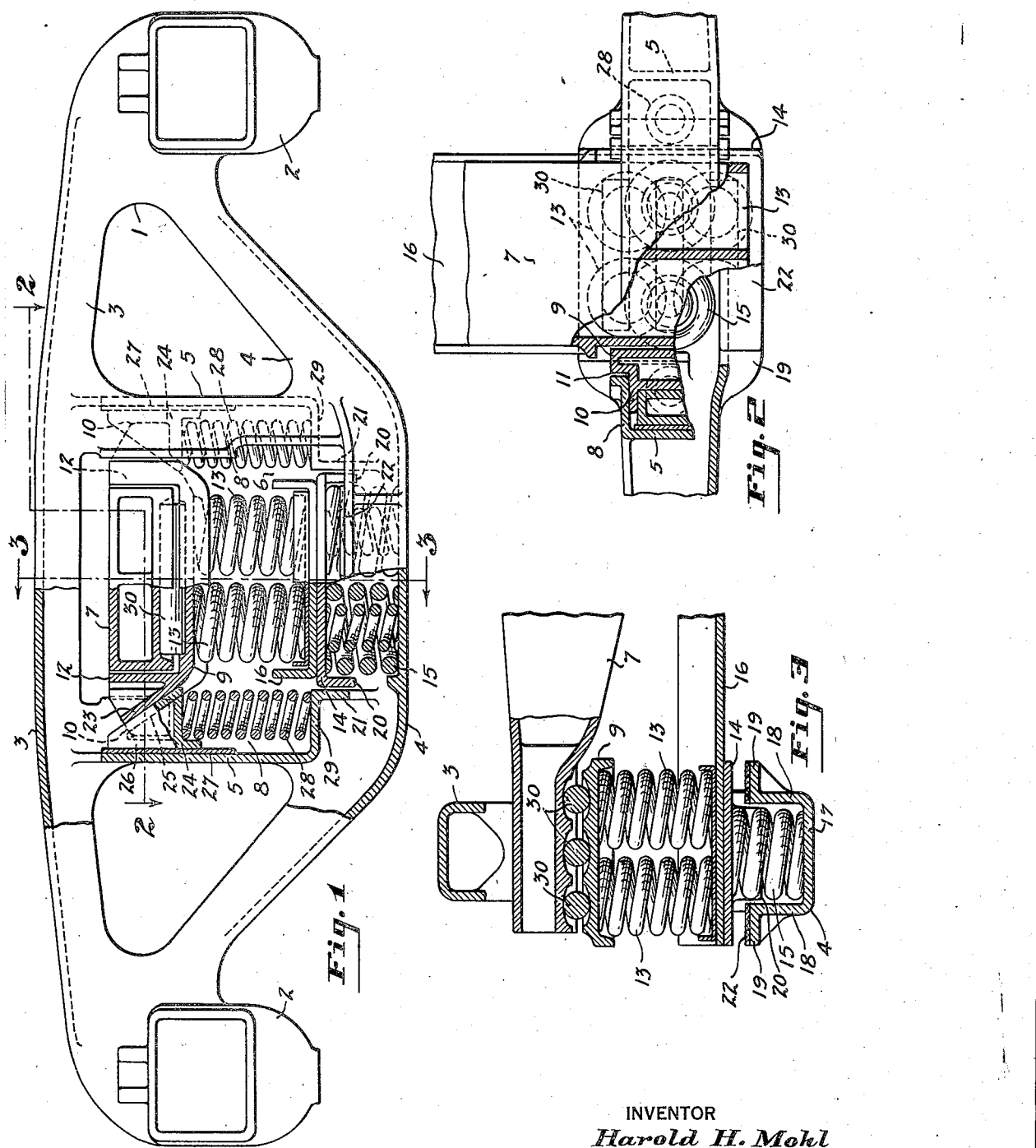
INVENTOR
*Harold H. Mohl*
BY *Evans + McCoy*
ATTORNEYS INVENTOR
Harold H. Mohl
BY Evans & McCoy
ATTORNEYS Patented Apr. 18, 1944

2,346,860

UNITED STATES PATENT OFFICE 2,346,860

CAR TRUCK

Harold H. Mohl, Davenport, Iowa, assignor, by mesne assignments, to McConway & Torley Corporation, Pittsburgh, Pa., a corporation of Pennsylvania Application September 26, 1941, Serial No. 412,453

3 Claims. (Cl. 105—186)

This invention relates to freight car trucks and more particularly to the cushion support and lateral motion provision for the car body, and has for its object to provide effective spring cushion in which excessive vibratory movements of the supporting springs are prevented and to provide an effective lateral motion device in combination with said spring cushion.

When the speed of travel of a railway car is such that impacts of the truck wheels upon regularly spaced rail joints coincide with the natural vibration frequency of the supporting spring, the spring vibrates with an increasing amplitude of movement which imparts to the car body an increasing vibratory movement resulting in a heavy shock when the amplitude of vibration has built up to a point sufficient to drive the springs solid.

Springs may be provided for light cars which permit travel at speeds higher than the critical speed referred to. However, such springs are too soft to provide cushioning action for an ordinary freight car loaded to capacity. On the other hand, a light car may be provided with springs whose natural frequency is considerably above ordinary running speeds so that harmonic oscillations are not encountered for light loads. However, while such springs can carry the maximum car loads, they are much too stiff to adequately cushion the light car and furthermore, heavy loads reduce the critical period to such an extent as to place it in the range of desired running speeds, so that harmonic oscillations are encountered with heavy loads.

In general freight service, the loads carried vary as much as 400% and it is, therefore, obvious that means to prevent harmonic oscillation for any particular running speed cannot be devised since the critical speed varies with the load. Damping means such as snubbers have been extensively used, but if powerful enough to be effective during the periods in which the car is traveling at critical speeds, the damping means have the effect of objectionably stiffening the spring cushion at speeds other than critical. The present invention utilizes differential cushioning springs and damping means so combined with the springs that harmonic oscillation is prevented without undue stiffening of the cushion at any speed or load.

With the above and other objects in view the invention may be said to comprise the freight car truck as illustrated in the accompanying drawings, hereinafter described and particularly set forth in the appended claims, together with such variations and modifications thereof as will be apparent to one skilled in the art to which the invention pertains.

Reference should be had to the accompanying drawings forming a part of this specification, in which:

Figure 1 is a side elevation of a truck embodying the invention, portions of the side frame, bolster and bolster cushioning members being broken away and shown in section;

Fig. 2 is a section taken on the line indicated at 2—2 in Fig. 1;

Fig. 3 is a section taken on the line indicated at 3—3 in Fig. 1;

Figure 4:
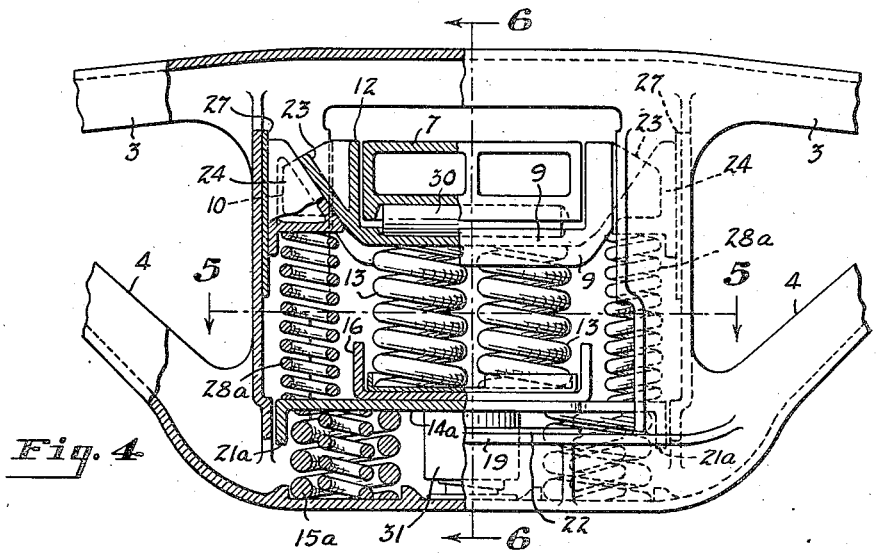
Fig. 4 is a fragmentary side elevation showing a truck of slightly modified construction.

In the accompanying drawings one side frame, together with the bolster supporting cushioning elements carried by that side frame, is illustrated, it being understood that the construction shown is duplicated at the opposite side of the truck as is common practice in the art.

Referring to the accompanying drawings, the truck is provided with side frame 1 having journal boxes 2 at its ends, which receive the supporting axles, a top compression chord 3, a bottom tension chord 4, and spaced columns 5 connecting the top and bottom chords and providing a central opening 6. The bolster 7 has an end portion projecting through the opening 6, the bolster 7 extending across the space between the side frames and providing a support for the car body. The columns 5 are disposed vertically and are in the form of oppositely facing channels having side flanges 8 which serve to guide a vertical movable bolster supporting member 9. The bolster supporting member 9 has a portion 10 fitting between the flanges 8 and shoulders 11 engageable with the edges of the flanges 8. The supporting member 9 has spaced upstanding flanges 12 which provide a channel in which the end of the bolster is received. The supporting member 9 is spring supported, the spring support as herein illustrated being a group of coil springs 13. The supporting member 9 rests upon the upper ends of the springs 13 and the lower ends of the springs are supported upon lower supporting member 14, which is mounted for vertical movement in the frame and which is supported upon a lower set of springs 15 interposed between the member 14 and the bottom chord 4 of the side frame. The springs 13 may be supported upon the spring plank 16 which may or may not be an integral part of the supporting member 14, as desired.

The portion of the bottom chord 4 beneath the opening 8 is in the form of an upwardly facing channel having a bottom web 17 and side walls 18 which terminate at their upper edges in horizontal outwardly extending flanges 19. The lower supporting member 14 has downturned flanges 20 at the ends thereof which are of a length to enter the space between the side walls 18 of the bottom chord channel, and vertical cross webs 21 are provided on the side frame adjacent the ends of the member 14 and across the bottom chord channel which coact with the flanges 20 to guide the member 14 vertically. A car body is supported through the bolster 7 by the superimposed sets of springs 13 and 15 and the springs 15 are of sufficient strength to normally support the member 14 above the bottom chord of the side frame. The member 14 is of a width to overlie the flanges 19 of the bottom chord, so that the movement of the springs 15 under applied pressure is limited by the engagement of the member 14 with the flanges 19 which serve as stops to limit the compression of the springs 15. The capacity of the springs 15 is preferably such that the member 14 is supported slightly above the stop flanges 19 under the weight of a car body loaded to capacity, so that the stops come into action only when the springs 15 are subjected to abnormal pressures due to impact or vibration. If desired, the stop flanges 19 may be faced with suitable cushioning pads 22 composed of suitable material, such as rubber and fabric.

The upper supporting member 9 has inclined portions 23 at opposite ends thereof and wedge blocks 24 are interposed between the inclined end portions 23 and the guide columns 5. The wedge blocks 24 are each provided with an inclined inner wall 25 which bears against the inclined end portions 23 of the member 9 and vertical outer walls 26 which bear against the guide columns. Suitable wear plates 27 of hardened steel or the like may be attached to the inner faces of the columns 5 to take the wear of the wedge blocks. Coil springs 28 are interposed between the bottoms of the wedge blocks 24 and horizontal ledges 29 formed on the side frame adjacent the lower ends of the columns and directly beneath the wedge blocks.

A car having springs such as springs 13 and 15 and traveling upon a railway track at the critical speed for the combination of springs will tend to vibrate vertically with the springs. If the capacity of the spring 15 be such that with a full load the supporting member 14 is normally positioned close to but above the stop flanges 19, the stop flanges will provide an effective means for breaking up this harmonic oscillation. Any harmonic vibration will set up a bouncing movement sufficient to seat supporting member 14 on the stop flanges 19, thereby limiting the deflection of spring 15 and raising the period of vibration of the spring combination. Under these conditions the frequency constant of the spring combination changes from one value to another and back again before car body oscillation can build up to any great extent.

However, this harmonic breaking action cannot be obtained with light loads since under these conditions the supporting member 14 is a considerable distance above the stop flanges 19 and the car body would have to oscillate or bounce badly in order to seat the supporting member on the flanges. Furthermore, while it is generally preferable to make the springs 15 stiff enough to position the supporting member 14 a short distance above flanges 19, under full load conditions there are conditions under which it is desirable to seat the supporting member before full load is reached. Under these conditions the heavy springs 13 are working alone and without benefit of the differential action explained above. Accordingly, it is desirable to introduce additional damping means to control these last mentioned conditions.

The friction snubber described above meets these requirements. The wedge blocks 24 impart an increasing resistance to the downward movement of the bolster as the springs 28 are compressed and, since the springs 28 are interposed between the wedge blocks 24 and the side frame 1, the compression of the springs 28 is equal to the sum of the compression of the springs 13 and 15. The variation in snubbing action due to variations in load is directly proportional to the load until the supporting member seats upon the side frame flanges 19. Beyond that point the springs 13 may compress further, adding an equal compression increment to the springs 28; but since the springs 15 cannot compress further, the snubbing action is increased at a reduced rate.

Since the critical speed for an empty car with the type of spring cushion shown is likely to lie in the desired operating range, spring damping for empty cars and lightly loaded cars is highly desirable. However, the damping forces need not be great because the load is light and comparatively little energy need be absorbed in order to stop harmonic oscillation. Under heavy loads the critical speed is reduced below the desired operating speeds so that little trouble from harmonics is experienced. Furthermore, because of the harmonic breaking action of the differential spring group, little more snubbing force is needed under heavy loads to control harmonic action. Any snubbing forces in excess of the minimum required will be objectionable since the spring group is stiffened and shock transmission from roadbed to car is increased.

In order to reduce lateral shocks to the car body it is desirable to provide some means whereby the truck can move laterally with respect to the car body in response to track irregularities. Numerous constructions have been devised to provide for this lateral motion, the two most frequently used being swing hangers and roller motion. While swing hangers are common and effective, they require the use of a transom from which the bolster is hung by means of the hangers. The principal objections are that the transom is a heavy member adding excess weight to the truck and that it is difficult to provide a single snubber to control the action of all the springs in the truck.

Roller motion as shown in the drawings overcomes the above objections. The bolster 7 is mounted upon rollers such as 30 disposed transversely of the bolster and between the end of the bolster and the supporting member 9. The supporting member 9 as previously described is closely guided to move with the side frame 3 on all lateral movements, but by reason of the roller support, the bolster may move laterally within limits with respect to the side frame. Thus, lateral movements of the truck itself caused by track irregularities are not transmitted to the car body. While rollers have been shown to provide lateral motion, any yielding connection between the bolster ends and the supporting member 9 is satisfactory. It is to be noted here that the wedge blocks 23 exert controlling forces over all the supporting springs between the side frames and the car body support, or in other words, the wedge blocks exert controlling forces over all springs between sprung and unsprung weights.

If it is not desired to provide for lateral motion, the connection between the bolster ends and the supporting members 9 may be rigid or the supporting member 9 may be an integral part of the bolster. In either case the action of the snubber is the same.

Figure 5:
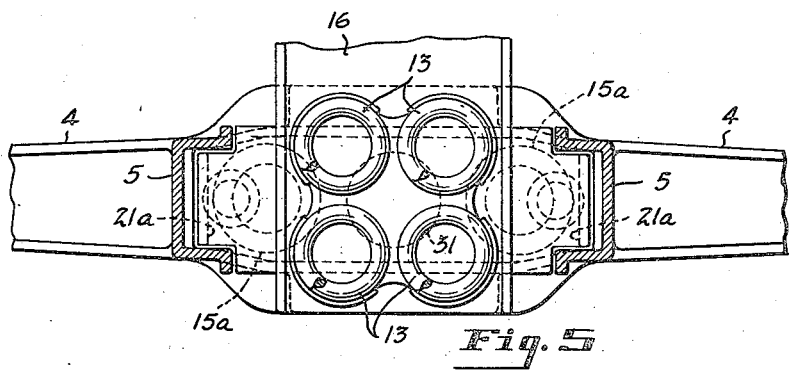
Fig. 5 is a section taken on the line indicated at 5—5 in Fig. 4.
Figure 6:
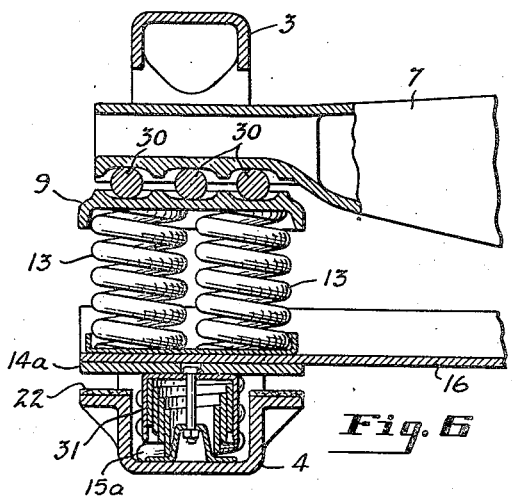
Fig. 6 is a section taken on the line indicated at 6—6 in Fig. 4.

In Figs. 4 to 6 of the drawings a slightly modified structure is disclosed in which the upper supporting springs 13 rest upon a lower supporting member 14a. The member 14a is somewhat longer than the supporting member 14 in the modification first described, the spring supporting ledges 29 are eliminated and the member 14a, which is guided between vertical webs 21a, provides a support for the lower ends of the snubber springs 28a. By reason of the greater length of the supporting member 14a, the springs 15a may be positioned further apart so as to transmit the load to portions of the side frame adjacent the lower end of the guide columns. The harmonic braking action of the stops 19 is the same as in the modification first described, but the springs 28a being interposed between the wedge blocks 24 and the supporting member instead of between the wedge blocks 24 and a fixed portion of the frame, have uniform increase in compression upon increase in load imposed upon the bolster. This is true since the compression in the springs 28a is always equal to compression in springs 13 and the compression in these springs is always in proportion to the load. It is obvious that the springs 28 and 28a must have different compression rates since the springs 28a are subject to less total deflection.

If desired, another coil may be placed under the center of the supporting member 14a in order to more evenly distribute the load on the side frame, or if desired, one of the common types of snubber indicated at 31 may be used. This auxiliary snubber may be fairly light to supplement the action of the main snubber when the car has a light or medium load and which also serves to reduce the force of impacts against the stop flanges 19.

It is to be understood that variations and modifications of the specific device herein shown and described for purposes of illustration, may be made without departing from the spirit of the invention.

What I claim is:

1. In a car truck having a car body supporting bolster and axle supported side frames, an upper bolster supporting member mounted for vertical movement in each side frame, a lower supporting member mounted for vertical movement in each side frame, a set of cushioning springs interposed between said upper and lower members, a set of cushioning springs interposed between said lower member and the side frame, stops engageable with said lower supporting member upon imposition of abnormal pressure on the springs for limiting the movement of said lower sets of springs, a snubber for applying a gradually increasing resistance to movements of the bolster supporting member in a downward direction, and a second snubber interposed between the lower supporting member and the side frame.

2. A car truck having a body supporting bolster, a side frame having top and bottom chords and spaced columns between the chords forming a bolster opening, a bolster supporting member guided for vertical movement between said columns, a lower supporting member mounted for vertical movement in said opening below said upper member, a yielding connection between the bolster and bolster supporting member to permit lateral movement of the bolster with respect to the side frames, cushioning springs interposed between said upper and lower members, cushioning springs interposed between said lower member and said bottom chord, wedges interposed between the ends of said upper member and the guide columns, seats on said lower supporting member, and springs interposed between said seats and wedges.

3. In a car truck having a car body supporting bolster and side frames, a bolster supporting member, a lower supporting member mounted for vertical movement in each side frame, a set of cushioning springs interposed between said bolster and lower supporting members, a set of cushioning springs interposed between said lower members and side frames, means acting to limit oscillations of the last-mentioned springs, a snubber for applying a gradually increasing resistance to movements of the bolster supporting member in a downward direction, and a second snubber interposed between the lower supporting member and the side frame.

HAROLD H. MOHL.